United States Patent
Shiigi et al.

(10) Patent No.: US 8,100,328 B2
(45) Date of Patent: Jan. 24, 2012

(54) APPARATUS AND METHOD FOR DATA PROCESSING FOR IC TAGS AND IMAGE FORMING DEVICE WITH THE APPARATUS

(75) Inventors: Masahiro Shiigi, Toyokawa (JP); Kouji Ohara, Toyohashi (JP); Takeshi Nomura, Toyohashi (JP); Takeshi Tamada, Toyohashi (JP); Hiroshi Tokuan, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 273 days.

(21) Appl. No.: 11/386,896

(22) Filed: Mar. 23, 2006

(65) Prior Publication Data

US 2006/0237536 A1    Oct. 26, 2006

(30) Foreign Application Priority Data

Apr. 25, 2005   (JP) ................. 2005-126360

(51) Int. Cl.
   *G06K 7/00*   (2006.01)
(52) U.S. Cl. .......... 235/439; 235/451; 235/491
(58) Field of Classification Search .......... 235/439, 235/451, 491
   See application file for complete search history.

(56) References Cited

U.S. PATENT DOCUMENTS

| | | | |
|---|---|---|---|
| 6,010,075 A | 1/2000 | Ishifuji et al. | |
| 6,246,326 B1 * | 6/2001 | Wiklof et al. | 340/572.1 |
| 7,056,048 B2 * | 6/2006 | Braun et al. | 400/630 |
| 7,077,489 B2 * | 7/2006 | Waters | 347/2 |
| 7,223,030 B2 * | 5/2007 | Fessler et al. | 400/76 |
| 7,249,819 B2 * | 7/2007 | Burdette et al. | 347/19 |
| 7,586,410 B2 * | 9/2009 | Tsirline et al. | 340/572.1 |
| 2004/0100381 A1 * | 5/2004 | Waters | 340/568.1 |
| 2006/0071063 A1 * | 4/2006 | Duckett | 235/375 |

FOREIGN PATENT DOCUMENTS

| | | |
|---|---|---|
| JP | 5-75864 | 10/1993 |
| JP | 2003-150907 | 5/2003 |
| JP | 2003-296669 | * 10/2003 |
| JP | 2003-300356 | 10/2003 |
| JP | 02003296669 | * 10/2003 |
| JP | 2003-331220 | 11/2003 |
| JP | 2004-82432 | 3/2004 |
| JP | 2004-192222 | 7/2004 |
| JP | 2004/244140 | 9/2004 |
| JP | 2004-280328 | 10/2004 |
| WO | WO 98/21691 | 5/1998 |

OTHER PUBLICATIONS

Japanese Office Action dated Jan. 29, 2008 (with English Language Translation).

* cited by examiner

*Primary Examiner* — Daniel Hess
*Assistant Examiner* — Michael Andler
(74) *Attorney, Agent, or Firm* — Buchanan Ingersoll & Rooney PC

(57) ABSTRACT

The invention relates to an apparatus and method for data processing for IC tags and an image forming device capable of recording an image onto a conveying medium on which IC tags are mounted. The apparatus and method set up a state that enables reliable radio communication between a reader/writer and an IC tag and read and/or write electronic information from/to IC tags. The reader/writer's antenna to face IC tags mounted on the conveying medium, arranged in multiple rows and columns in the conveyance direction, is skewed so that the IC tags pass sequentially under the antenna and each IC tag can be identified. The reader/writer reads and/or writes electronic information associated with the thus identified IC tag.

8 Claims, 12 Drawing Sheets

APPARATUS AND METHOD FOR DATA PROCESSING FOR IC TAGS AND IMAGE FORMING DEVICE WITH THE APPARATUS

This application is based on application No. 2005-126360 filed in Japan, the contents of which are hereby incorporated by reference.

BACKGROUND OF THE INVENTION

1. Field of the Invention

This invention relates to an apparatus and method for data processing for IC tags and an image forming device such as a label printer. In particular, the invention relates to an apparatus and method for data processing for IC tags by which electronic information is read from and/or written to IC tags moving in a given direction, the IC tags being transported by a conveying medium on which they are mounted, and an image forming device with the data processing apparatus for IC tags.

2. Prior Art

A wireless communication device comprising a storage device, a transceiver, and an antenna is a semiconductor device from/to which contactless reading and/or writing of electronic information can be performed, which is generally called a Radio Frequency Identification (RFID) device. RFID devices are used, embedded in various kinds of IC cards such as credit cards. Recently, it has been proposed to use the RFID devices for management of commercial goods by embedding them into labels tagged to commercial goods, recording information about the goods electronically onto them, and reading the information from them as required.

To read and/or write electronic information from/to such an RFID device (hereinafter referred to as an IC tag), a system is known in which a conveying medium such as recording paper on which IC tags mounted by bonding and other means is allowed to pass through a reader/writer which performs reading and/or writing of electronic information, electronic information is transmitted and received between the antenna of the reader/writer and the antenna of each IC tag, and reading and/or writing of electronic information from/to the IC tags will be performed in a contactless state.

Some reader/writer of this kind quickly reads and/or writes electronic information from/to IC tags mounted on a conveying medium, arranged in multiple rows along the direction in which the conveying medium moves. In this case, the plurality of IC tags on the conveying medium are sequentially identified and electronic information for each identified IC tag is read from and/or written to each IC tag. To do this, the antenna of the reader/writer is moved in a direction orthogonal to the direction of moving of the IC tags to sequentially identify the IC tags arranged in multiple rows; this mechanism is disclosed in Japanese Laid Open Patent Publication No. 2003-300356.

A conveying medium on which IC tags are mounted, arranged in multiple rows and columns along the direction in which the conveying medium moves is also known, which is disclosed in Japanese Laid Open Patent Publication No. 2003-331220.

Moreover, in sorting a device that uses IC tags for sorting packages, an antenna device allowing for reliable reading of electronic information from IC tags is disclosed in Japanese Laid Open Patent Publication No. 2004-244140. This antenna device consists of two coil antennas placed to surround a conveyer belt for conveying packages and the two antennas extend in the direction of conveyance and are placed asymmetrically to widen the area where communication with IC tags is possible in the conveyance direction and ensure longer communication time during which more read operations are performed.

Furthermore, when the conveying medium on which IC tags are mounted is moved at a constant speed, if the amount of data for electronic information to be read from and/or written to an IC tag is great, reading and/or writing of the information may be uncompleted during the passage of the IC tag through the antenna coverage of the reader/writer. When a plurality of IC tags exist in the antenna coverage of the reader/writer, an IC tag for which reading and/or writing of electronic information should be performed cannot be identified and a communication error may take place. The use of a smaller antenna for countermeasures against such error may result in incompletion of reading and/or writing of electronic data during the passage through the antenna coverage. To address such a problem, a system in which multiple readers/writers or their antennas are provided and one of them is selected according to condition is disclosed in Japanese Laid Open Patent Publication No. 2004-082432.

The above prior art readers/writers that read and/or write electronic information from/to IC tags each bring about disadvantages below: need for the mechanism to move the antenna orthogonally to the direction in which IC tags are conveyed (Japanese Laid Open Patent Publication No. 2003-300356); provision of multiple antennas for countermeasures against communication errors which may occur when a plurality of IC tags exist in the antenna coverage of the reader/writer; and need for communication error preventing measures such as providing more spacing between IC tags on the conveying medium in the conveyance direction.

SUMMARY OF THE INVENTION

It is a primary object of this invention to provide an apparatus and method for data processing for IC tags, wherein the apparatus and method set up a state that enables reliable radio communication with a plurality of IC tags mounted on a conveying medium and read and/or write electronic information from/to the IC tags, and to provide an image forming device capable of recording an image onto the conveying medium on which the IC tags are mounted.

It is another object of this invention to provide the data processing apparatus for IC tags that sequentially reads and/or writes electronic information by radio communication from/to each of a plurality of IC tags mounted on a conveying medium, arranged in multiple rows and columns along the conveyance direction, each tag having a storage device and a wireless transceiver.

It is yet another object of this invention to provide the data processing method for IC tags that sequentially reads and/or writes electronic information by radio communication from/to each of a plurality of IC tags mounted on a conveying medium, arranged in multiple rows and columns along the conveyance direction, each tag having a storage device and a wireless transceiver.

It is a further object of this invention to provide the image forming device that reads and/or writes electronic information from/to a plurality of IC tags mounted on a conveying medium and can record an image related to the IC tags on the conveying medium on which the IC tags are mounted.

Other objects of this invention will be apparent from the following detailed description with reference to the accompanying drawings.

DETAILED DESCRIPTION OF THE PREFERRED EMBODIMENTS

The following will describe typical embodiments of this invention.

First Embodiment

Figure 1:
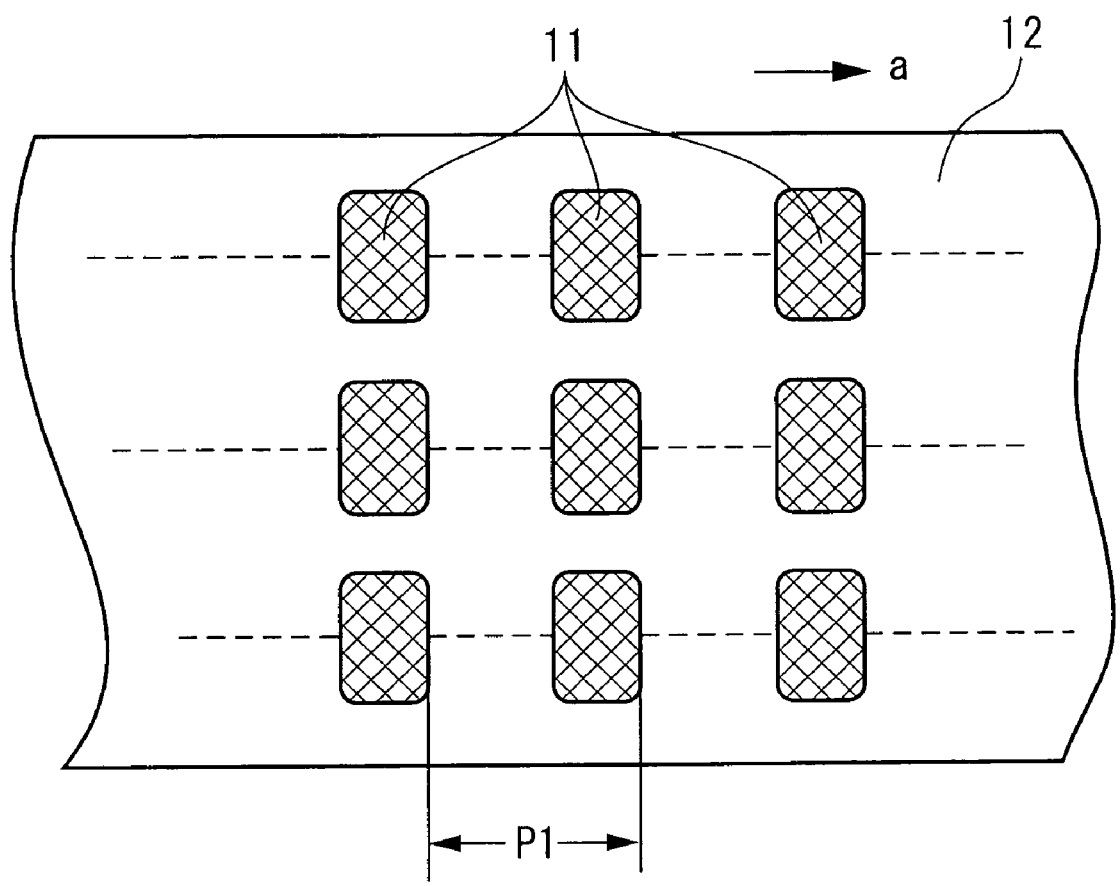
FIG. 1 is a front view of a conveying medium to which IC tags are attached.

FIG. 1 is a front view of a conveying medium on which IC tags are mounted. Wireless communication devices (hereinafter referred to as IC tags) 11, which will be described later, are mounted on the medium, arranged at fixed pitch p1 in multiple rows (three rows in FIG. 1) in parallel with the direction of arrow a in which the conveying medium 12 moves (the direction of conveyance of the IC tags) and in multiple columns along the direction of arrow a. The conveying medium 12 is, for example, continuous-form paper or other similar media for use in a label printer or the like, on which visible information such as desired text is printed. After electronic information is read from and/or written to the IC tags 11 by a data processing apparatus which will be described later, the medium is cut into labels with predetermined dimensions and each label having an IC tag will be stuck to a commercial product or the like. Although, by way of example, labels are produced in this embodiment, it goes without saying that the scope of application of the invention involves similar objects such as cards, tags, and hangtags.

The conveying medium 12 is not limited to the above one in this embodiment and any similar medium on which IC tags 11 can be mounted may be used. For example, cut sheets instead of the continuous-form paper may be used.

In FIG. 1, the contour of an IC tag 11 corresponds to an area (hereinafter referred to as an effective area of an IC tag) where the field intensity of the IC tag's antenna is a predetermined signal level or more enabling normal communication with a reader/writer 14 and its antenna 15 which will be described later. In the following description, the term "IC tag" refers to an IC tag and its antenna and the contour of an IC tag refers to the effective area of the IC tag.

Figure 2:
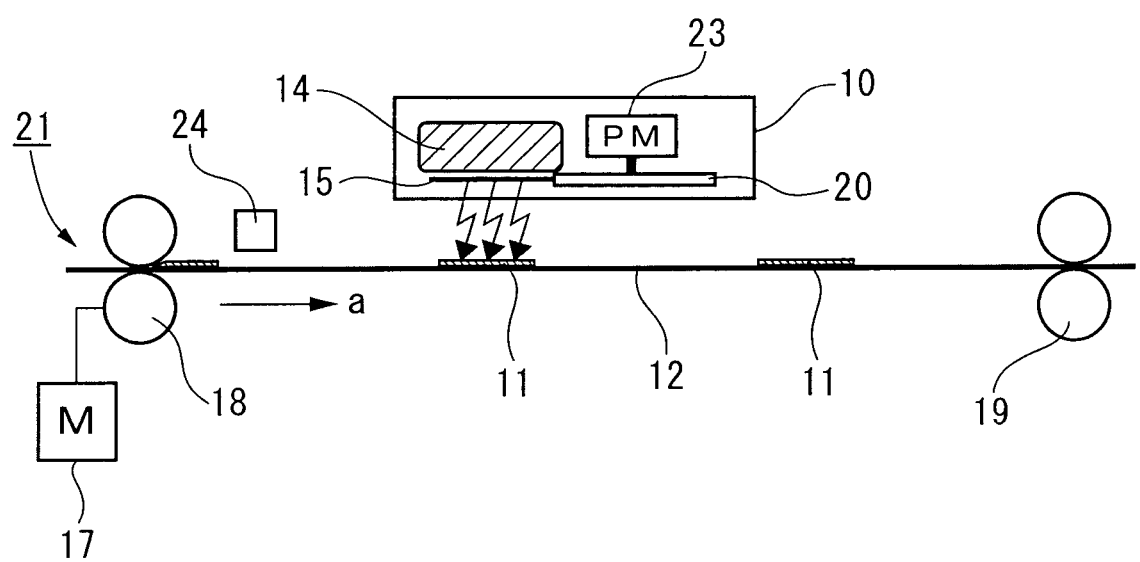
FIG. 2 is a front view of a data processing apparatus that performs writing/reading of electronic information to/from the IC tags to explain its configuration.

FIG. 2 is a front view of the data processing apparatus 10 that performs writing/reading of electronic information to/from the IC tags 11 to explain its configuration. The conveyance mechanism is constructed such that the conveying medium 12 moves at a constant speed in the direction of arrow a with a conveyor 21 consisting of pairs of transport rollers 18, 19 driven by a motor 17 for conveyance.

When the conveying medium 12 moves at a constant speed in the direction of arrow a, the IC tags mounted on it at fixed intervals also move at a constant speed in the direction of arrow a and the forward edge of an IC tag 11 is detected by a tag position sensor 24 located above and close to the transport path of the conveying medium.

The data processing apparatus 10 is located apart from the conveying medium 12, facing the side of the conveying medium 12 having the IC tags mounted thereon. Inside the data processing apparatus 10, a reader/writer 14 that reads/writes electronic information from/to IC tags is placed and its antenna 15 is installed to extend from an antenna adjuster 20 which will be described later. The antenna adjuster 20 is driven by a pulse motor 23.

Figure 3:
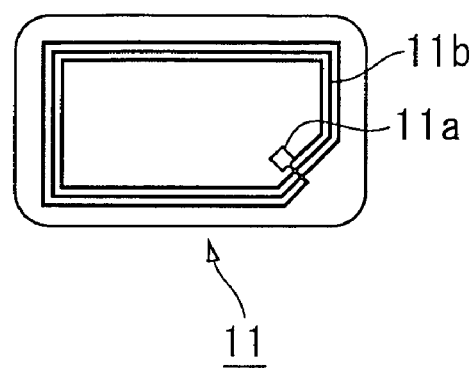
FIG. 3 is a front view of an IC tag to explain its configuration.

FIG. 3 is a front view of an IC tag 11 to explain its configuration. The IC tag 11 is a semiconductor device from/to which reading/writing of electronic information can be performed in a contactless manner. The tag consists of a wireless transceiver 11a including a storage device for storing electronic information and an antenna 11b laid on its periphery. By radio communication with the reader/writer 14, electronic information can be written and read to/from the tag. In this application, the IC tag 11 comprising the wireless transceiver 11a and the antenna 11b is called as an IC tag 11.

In the reader/writer 14, when electronic information inputted via an input means, which is connected to a controller 30 for the data processing apparatus 10, as will be described later, such as a computer (PC) 28 connected to the data processing apparatus 10, or electronic information to be recorded, entered via an operation panel 29 or the like are inputted, the inputted electronic information is written to the IC tag 11 by radio communication through its antenna 15 mounted to the reader/writer 14, and output to the computer (PC) 28 the electronic information of the IC tag 11 read from the reader/writer 14 through its antenna 15.

Figure 4:
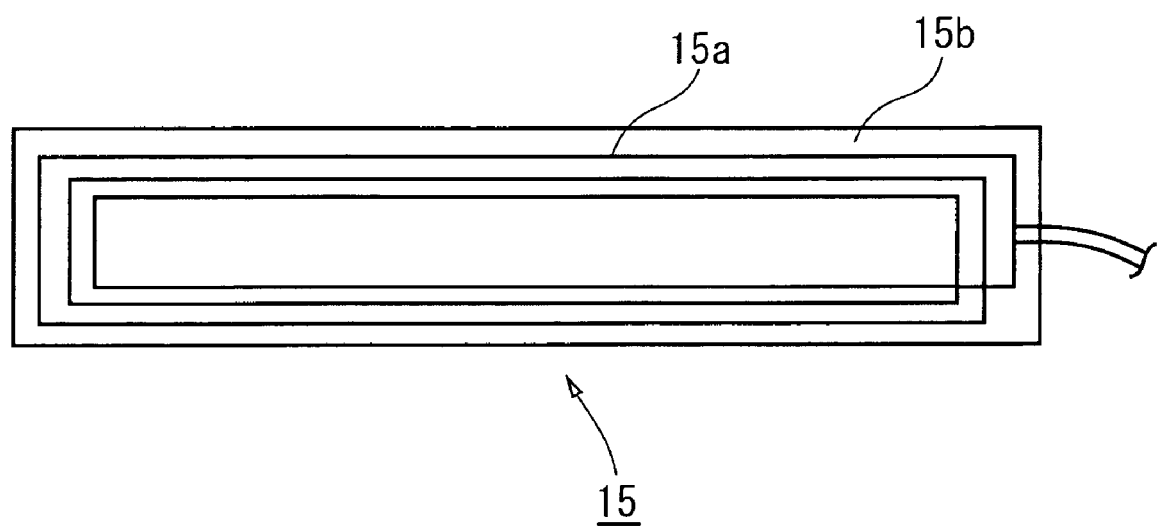
FIG. 4 is a front view of an antenna of a reader/writer to explain its configuration.

FIG. 4 is a front view of the antenna 15 of the reader/writer 14 to explain its configuration. The antenna 15 is formed by a wire 15a laid in loops on a resin board 15b with a high dielectric constant and connected to the reader/writer 14. The coverage of the antenna 15 is a range in which the field intensity of electromagnetic waves radiated from the antenna is a predetermined intensity or more and here it corresponds to a region delimited by outside lines formed by the wire 15a laid in roughly loops.

The antenna 15 is placed above and close to, being not in contact with, moving IC tags 11 on the conveying medium 12 and configured so that its angle can be adjusted by the antenna adjuster 20, which will be described later, to allow for identifying each of the IC tags 11 mounted on the conveying medium 12.

The antenna adjuster 20 horizontally turns the resin board 15b with a high dielectric constant on which the wire 15a of the antenna 15 is laid out by a predetermined angle θ by the pulse motor 23 and is configured by a known means. Calculating the angle θ by which the antenna 15 should be turned horizontally and controlling the antenna adjuster 20 to set the antenna 15 skew at the calculated angle θ are carried out by the controller 30 which will be described later.

Figure 5:
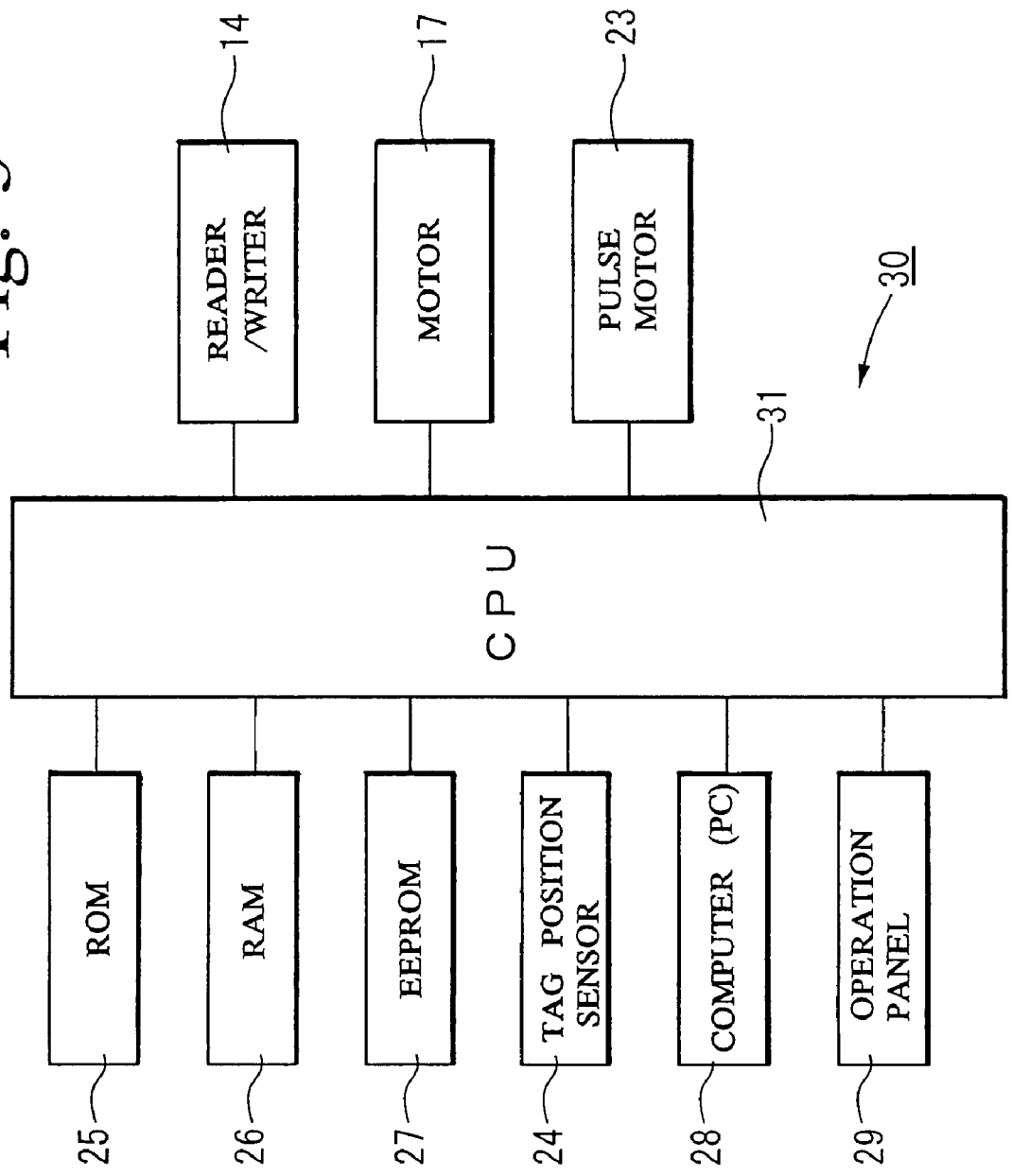
FIG. 5 is a block diagram of a controller that exerts control of the data processing apparatus.

FIG. 5 is a block diagram of the controller 30 that exerts control of the data processing apparatus 10. The core of the controller 30 is a CPU 31 and, to I/O ports of the CPU 31, a ROM 25 for storing software for control, a RAM 26, an EEPROM 27, the tag position sensor 24, the computer (PC) that outputs information to be recorded, and the operation panel 29 are connected. In addition, the reader/writer 14, the motor 17 for conveyance to drive the conveying medium 12, and the pulse motor 23 to drive the antenna adjuster 20 are connected to the CPU 31.

When the forward edge of an IC tag 11 is detected by the tag position sensor 24, based on a time when the IC tag 11 has been detected and information for the speed at which the conveying medium 12 moves in the direction of arrow a (known speed V), the effective area of the antenna 15 of the reader/writer 14, and the effective area of the IC tag 11, the controller 30 calculates timing to enable normal communication between the reader/writer and the IC tag and calculates and determines timing to start a motion of the reader/writer 14.

The controller 30 calculates the angle θ by which the antenna 15 should be turned horizontally by a calculation formula which will be provided later and drives the pulse motor 23 of the antenna adjuster 20 to turn the antenna 14 by the angle θ. Moreover, the controller 30 calculates the maximum data size that can be written to an IC tag by a calculation formula which will be provided later and compares the thus calculated maximum data size with the amount of data for electronic information to be written to the IC tag, which is held on the PC. If the maximum data size is greater, the controller 30 allows the reader/writer to write the electronic information; if the maximum data size is smaller, the controller 30 alerts the reader/writer to the impossibility to write.

Electronic information write operation that is executed under the control of the controller 30 will be outlined below. When a predetermined period of time elapses after the forward edge of an IC tag has been detected, and the calculated and determined timing to enable normal communication between the reader/writer 14 and the IC tag 11 has come, then the antenna 15 is turned horizontally by the angle θ calculated already and radio communication between the reader/writer 14 and the IC tag 11 is initiated to start writing of electronic information to the IC tag 11.

Figure 6:
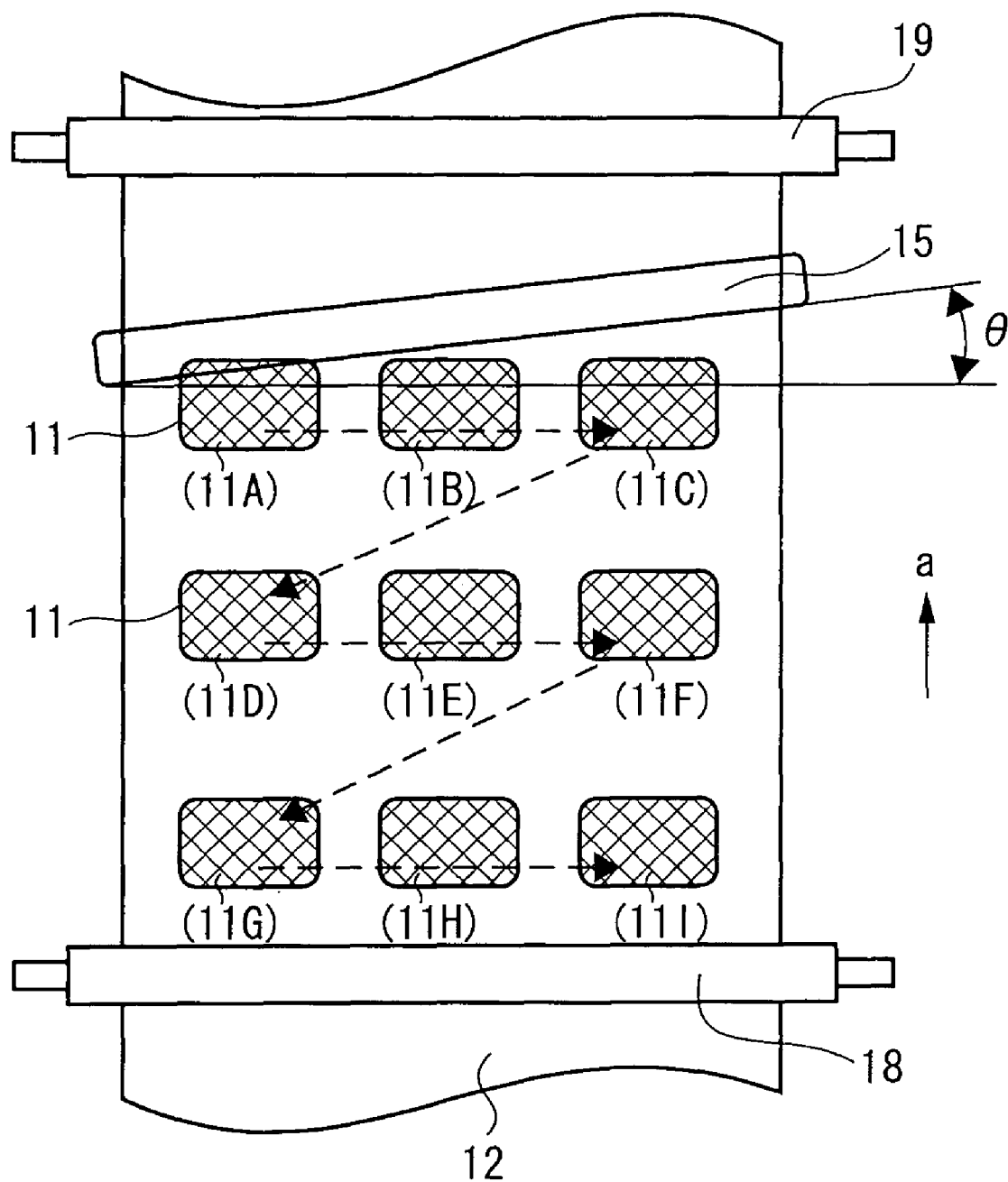
FIG. 6 is a diagram to explain identifying IC tags and sequence in which writing/reading of electronic information to/from the tags will be performed, according to a first embodiment of the invention.

FIG. 6 is a diagram to explain identifying the IC tags 11 arranged in multiple rows (three rows in this example) along the direction of arrow a in which the conveying medium 12 and the IC tags 11 move and in multiple columns (three columns in this example) along the direction of arrow a and sequence in which writing electronic information to the tags will be performed. The conveying medium 12 moves at a constant speed V in the direction of arrow a by the transport roller pairs 18, 19. As described above, the antenna 15 is skewed at the angle θ to a direction orthogonal to the direction in which the IC tags 11 move (the angle ((90−θ) degrees relative to the direction in which the IC tags 11 move).

Arranged on the conveying medium 12, if IC tags in an uppermost column are labeled 11A, 11B, 11C in order from the left, IC tags in a second column are labeled 11D, 11E, 11F in order from the left, IC tags in a third column are labeled 11G, 11H, 11I in order from the left, the IC tags will pass under the antenna 15 in sequence of 11A to 11I and, thus, each IC tag 11 can be identified.

Electronic information writing is executed as follows. When an IC tag 11A first enters the coverage of the antenna 15, radio communication between the reader/writer 14 and the IC tag 11A takes place and the identifier ID of the IC tag 11A is input via the reader/writer 14 to the computer 28. The computer 28 identifies the particular IC tag 11A by its identifier ID and outputs electronic information associated with the recognized IC tag 11A to the reader/writer 14. The reader/writer 14 writes the input electronic information to the IC tag 11A and recording finishes. In the same procedure, writing electronic information to subsequent IC tags 11B to 1ll is executed sequentially. Reading electronic information from the IC tags is also executed in the same sequence.

Figure 7:
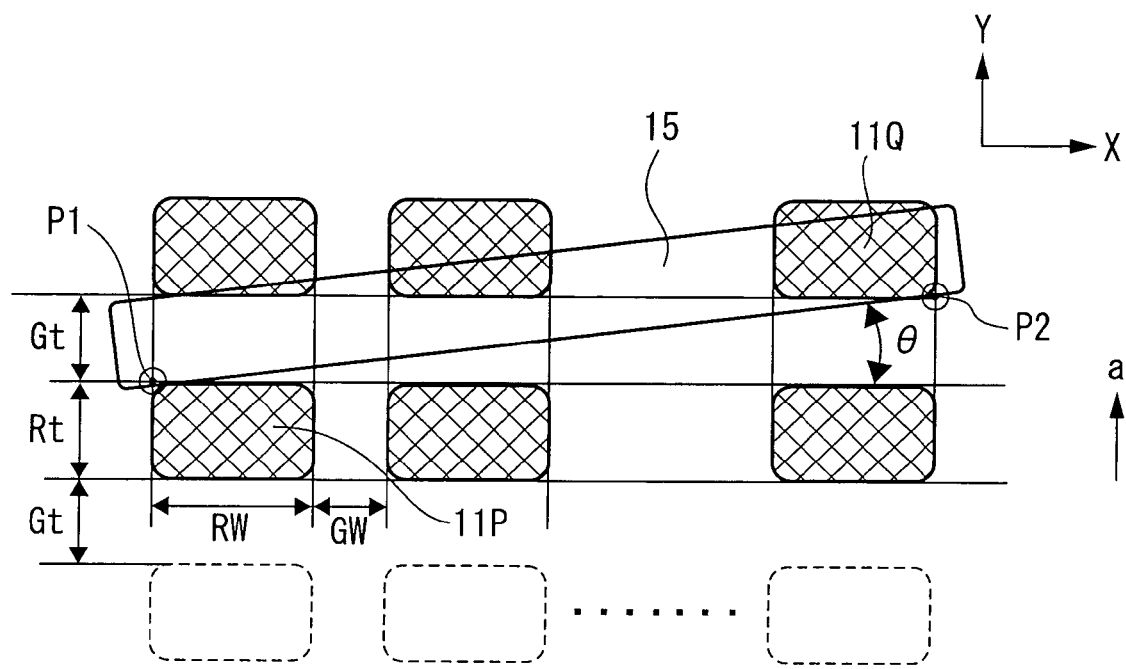
FIG. 7 is a diagram to explain how to calculate a skew angle of the reader/writer's antenna, according to the first embodiment.

Now, how to calculate the angle θ at which the antenna 15 is skewed will be described. FIG. 7 is a diagram to explain how to calculate the angle θ, where the direction of arrow a in which the conveying medium 12 moves is assumed to be Y-axis direction and the direction orthogonal to this is X-axis direction.

The antenna 15 is set skew so that one end of the lower edge of the effective area of the antenna 15 reaches a point P1 at the upper left corner of a leftmost IC tag 11P on the conveying medium, while the other end thereof reaches a point P2 at the lower right corner of a rightmost IC tag 11Q on one row above. The angle θ of this skew of the antenna 15 can be expressed by the following formula (1):

$$\tan \theta = Gt/\{Rw \times n + Gw \times (n-1)\} \tag{1}$$

where

Rw: Length of an IC tag in the X-axis direction (mm)

Gw: Distance of spacing between successive IC tags in the X-axis direction (mm)

Gt: Distance of spacing between successive IC tags in the Y-axis direction (mm)

n: the number of IC tags sequenced in the X-axis direction.

As shown in FIG. 6, when IC tags 11 are arranged in three rows in the X-axis direction, and provided the length of an IC tag 11 in the X-axis direction Rw=70 mm, the length of an IC tag 11 in the Y-axis direction Rt=50 mm, the distance of spacing between successive IC tags in the X-axis direction Gw=20 mm, Gt=20 mm, and the number of IC tags sequenced in the X-axis direction n=3, tan θ is calculated from the formula (1) as follows:

$$\tan \theta = Gt/\{Rw \times n + Gw \times (n-1)\}$$
$$= 20/\{70 \times 3 + 20 \times (3-1)\}$$
$$= 0.08$$

Hence, the angle θ at which the antenna 15 is skewed will be about 4.6 degrees.

Next, the maximum data size that can be written to an IC tag is calculated. The maximum data size is the data size that can be written during a range in which the effective area of an IC tag's antenna and the effective area of the reader/writer's antenna overlap; that is, to explain with FIG. 7, the data size that can be written during a period after the point P1 at the upper left corner of the IC tag 11P being conveyed has reached the lower edge of the effective area of the antenna 15 and until the point P2 at the lower right corner of the IC tag 11Q has passed the lower edge of the effective area of the antenna 15. The maximum data size M that can be written to one IC tag 11 can be expressed by the following formula (2):

$$M = [\{(Rt+Gt)/V\}/W]/n \quad (2)$$

where
Rt: Length of an IC tag in the Y-axis direction (mm)
Gt: Distance of spacing between successive IC tags in the Y-axis direction (mm)
n: the number of IC tags sequenced in the X-axis direction
V: Speed at which the medium moves (mm/s)
W: Time to write data in units to an IC tag (ms/byte).

Provided the length of an IC tag 11 in the Y-axis direction Rt=50 mm, the distance of spacing between successive IC tags in the Y-axis direction Gt=20 mm, the number of IC tags sequenced in the X-axis direction n=3, the speed at which the medium moves V=90 mm/s, and the time to write data in units to an IC tag W=3.25 ms/byte, the maximum data size that can be written to one IC tag 11 is calculated from the formula (2) as follows:

$$\begin{aligned} M &= [\{(Rt+Gt)/V\}/W]/n \\ &= [\{(50+20)/90\} \times 1000/3.25]/3 \\ &= 79.7 \text{ bytes} \end{aligned}$$

In the above formula (2), $\{(Rt+Gt)/V\} \times 1000$ represents time (ms) after the point P1 at the upper left corner of the IC tag lip being conveyed has reached the lower edge of the effective area of the antenna 15 and until the point P2 at the lower right corner of the IC tag 11Q has passed the lower edge of the effective area of the antenna 15. This is divided by the time to write data in units to an IC tag W=3.25 ms/byte, the result of which is further divided by 3, the number of IC tags sequenced in the X-axis direction 3; thereby the maximum data size that can be written per IC tag is calculated.

The controller 30 compares the calculated maximum data size that can be written to an IC tag with the amount of electronic data to be recorded to the IC tag, which is held on the PC. If the maximum data size is greater, the controller 30 allows the reader/writer to write the electronic information; if the maximum data size is smaller, the controller 30 outputs an alert signal.

Figure 8:
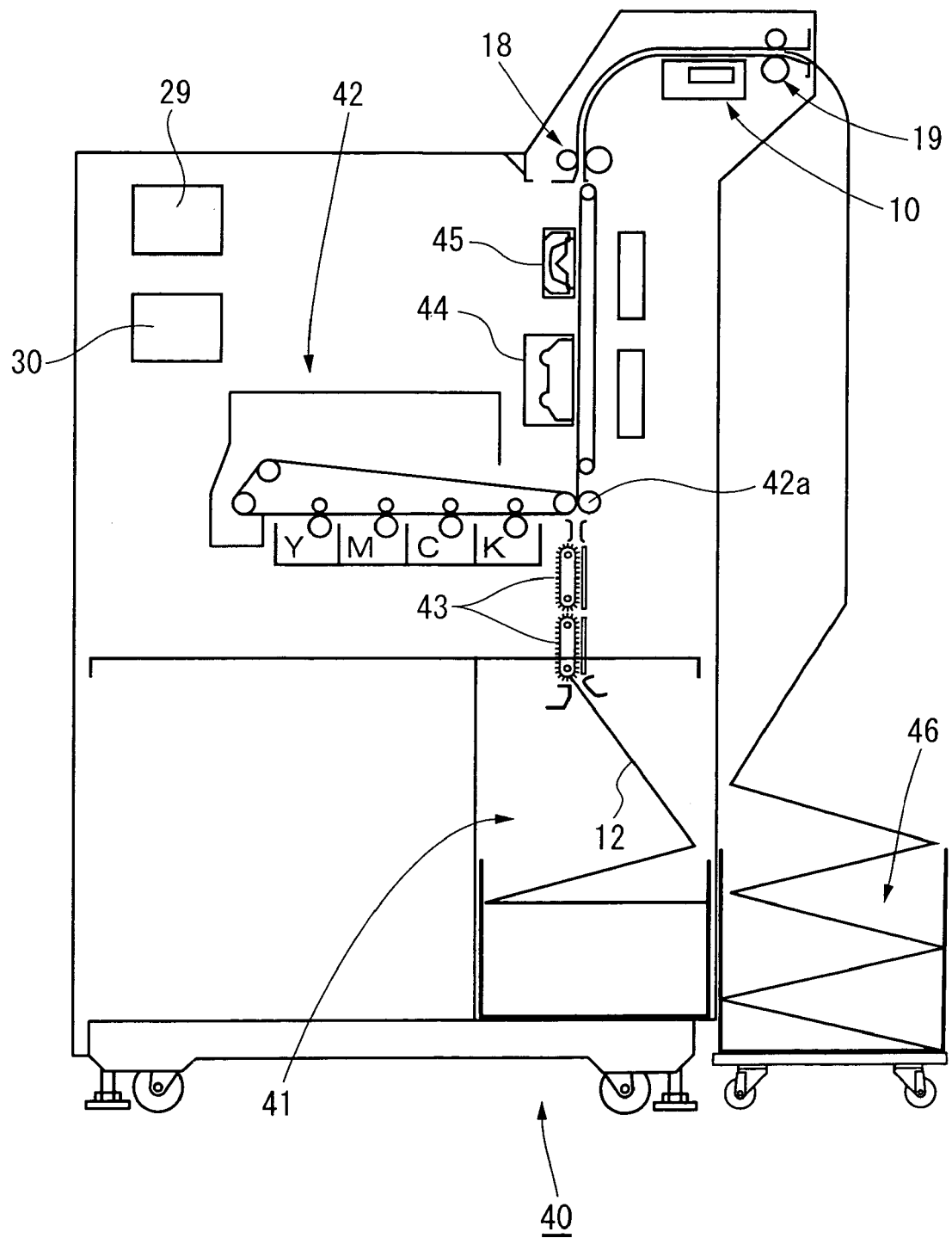
FIG. 8 is a cross-sectional view of a label printer that records visible information on a conveying medium on which IC tags are mounted and records electronic information to the IC tags to explain its configuration.

FIG. 8 is a cross-sectional view of a label printer that records visible information on the conveying medium on which the IC tags are mounted and records electronic information to the IC tags to explain an example of its configuration. The label printer 40 is comprised of a paper feeding section 41 in which conveying media 12 on which IC tags are mounted are stowed, a full color printer 42, the above-described data processing apparatus 10 equipped with the reader/writer 14 and the antenna 15 (see FIG. 2), a paper ejection section 46 in which processed conveying media 12 are collected, the operation panel 29, and the controller 30 (see FIG. 5). The full color printer which is an image forming unit is to print and record visible information associated with electronic information that is recorded to IC tags on a conveying medium 12 and other image information. Although a known, tandem-type full color printer is shown here, it goes without saying that any other type of printer may be employed.

As conveying media 12, continuous-form paper with pin-feed holes on both sides in the conveyance direction is used. Tracks 43 with pins to engage the pin-feed holes of the conveying media 12 are located along the transport path of conveying media. The tracks 43 are driven by a driving device, not shown, synchronously in conjunction with the transport roller pairs 18, 19 driven by the motor 17 for conveyance and transport a conveying medium 12 upward in FIG. 8. Downstream of the tracks 43, the full color printer 42 is placed and a full color toner image formed on its transfer belt by a known imaging unit is transferred to a conveying medium 12 at a second transfer unit 42a. The full color toner image transferred to the conveying medium 12 is preheated by a preheating unit 44 and fixed to the medium by a flash fusing unit 45.

Conventional roller-type fixing devices apply high pressure and high temperature to IC tags, resulting in damage to IC tags. The fixing device adopted in this embodiment fixes a toner image to an IC tag 11 in a contactless manner; that is, the flash fusing unit 45 emits flashing light toward the toner image on the conveying medium preheated by the preheating unit 44 and this heats the toner, specifically, heats infrared absorbents included in the toner.

The conveying medium 12 on which visible information was printed and recorded is transported to the data processing apparatus 10 where electronic information is written to the IC tags and the medium is dropped into the paper ejection section 46. Thereafter, by a post handling device, not shown, the conveying medium is cut into labels as finished goods, each label having visible information recorded thereon with an IC tag having electronic information recorded thereon.

Second Embodiment

A data processing apparatus of a second embodiment of the invention has the same reader/writer and antenna as in the first embodiment, but the antenna is not skewed. Instead, by modifying the arrangement of the IC tags on the conveying medium, each IC tag can be identified. Components corresponding to those described in the first embodiment are assigned the same reference numbers and their explanation is not repeated. The following description of the second embodiment focuses on difference from the first embodiment.

In the data processing apparatus 10 of the first embodiment, a plurality of IC tags 11 are arranged in multiple rows and columns along the direction of arrow a in which the conveying medium and the IC tags move, as shown in FIG. 6, and the apparatus is configured so that each IC tag 11 will be identified by skewing the antenna 15 of the reader/wrier 14 at the angle θ.

Figure 9:
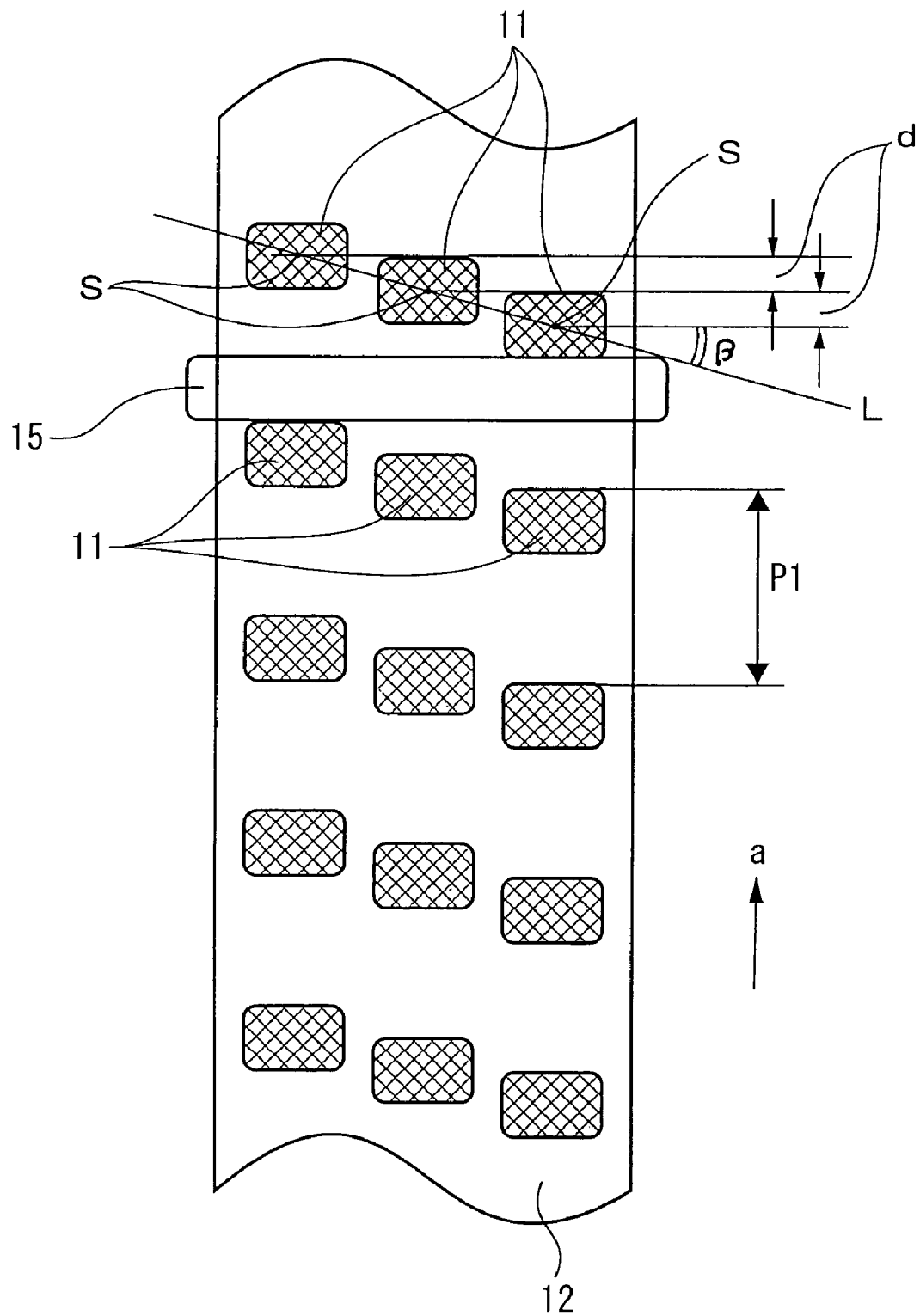
FIG. 9 is a diagram to explain how IC tags are arranged on the conveying medium, according to a second embodiment of the invention.

FIG. 9 is a diagram to explain how IC tags 11 are arranged on the conveying medium 12, according to the second embodiment. In the second embodiment, a plurality of IC tags 11 are arranged at fixed pitch p1 in multiple rows (three rows in FIG. 9) in parallel with the direction of arrow a in which the IC tags 11 move. In the direction orthogonal to this (a direction perpendicular to the arrow a), the IC tags are arranged in multiple columns. In each column, second-row and subsequent-row tags are shifted back by a fixed distance d to the one on the preceding row in the direction of arrow a. In other words, a line passing through the centers of the IC tags 11 arranged in each column is skewed at an angle β to the direction orthogonal to the direction in which the IC tags 11 move.

When the IC tags 11 are arranged as above, as the conveying medium and the IC tags 11 move, the IC tags in each column sequentially reach the effective area of the antenna 15 of the reader/writer placed orthogonally to the direction in which the IC tags move. Thus, each IC tag can be identified without skewing the antenna 15 of the reader/writer. Each IC tag can be identified properly by setting the skew angle β of the line passing through the centers of the IC tags arranged in each column to an angle calculated by the same calculation formula as used to obtain the angle θ at which the antenna of the reader/writer is skewed in the above-described configuration.

According to the second embodiment, the antenna adjuster 20 (see FIG. 2) to skew the reader/writer antenna 15 at the angle θ is eliminated from and the structure of the data processing apparatus 10 can be made simpler.

Third Embodiment

This section describes a data processing apparatus of a third embodiment of the invention. The above-described data processing apparatus of the first embodiment fixes the skew angle of the reader/writer antenna to a predetermined angle θ determined by calculation and reads and/or writes electronic information from/to IC tags being conveyed. On the other hand, in the third embodiment, the apparatus reads and/or writes electronic information from/to IC tags, while changing the skew angle of the reader/writer antenna in conjunction with the conveyance of the IC tags. The data processing apparatus of the third embodiment is capable of identifying each IC tag positively and reliable reading and/or writing of electronic information, even if a plurality of IC tags are arranged closely with each other on the conveying medium.

Figure 10:
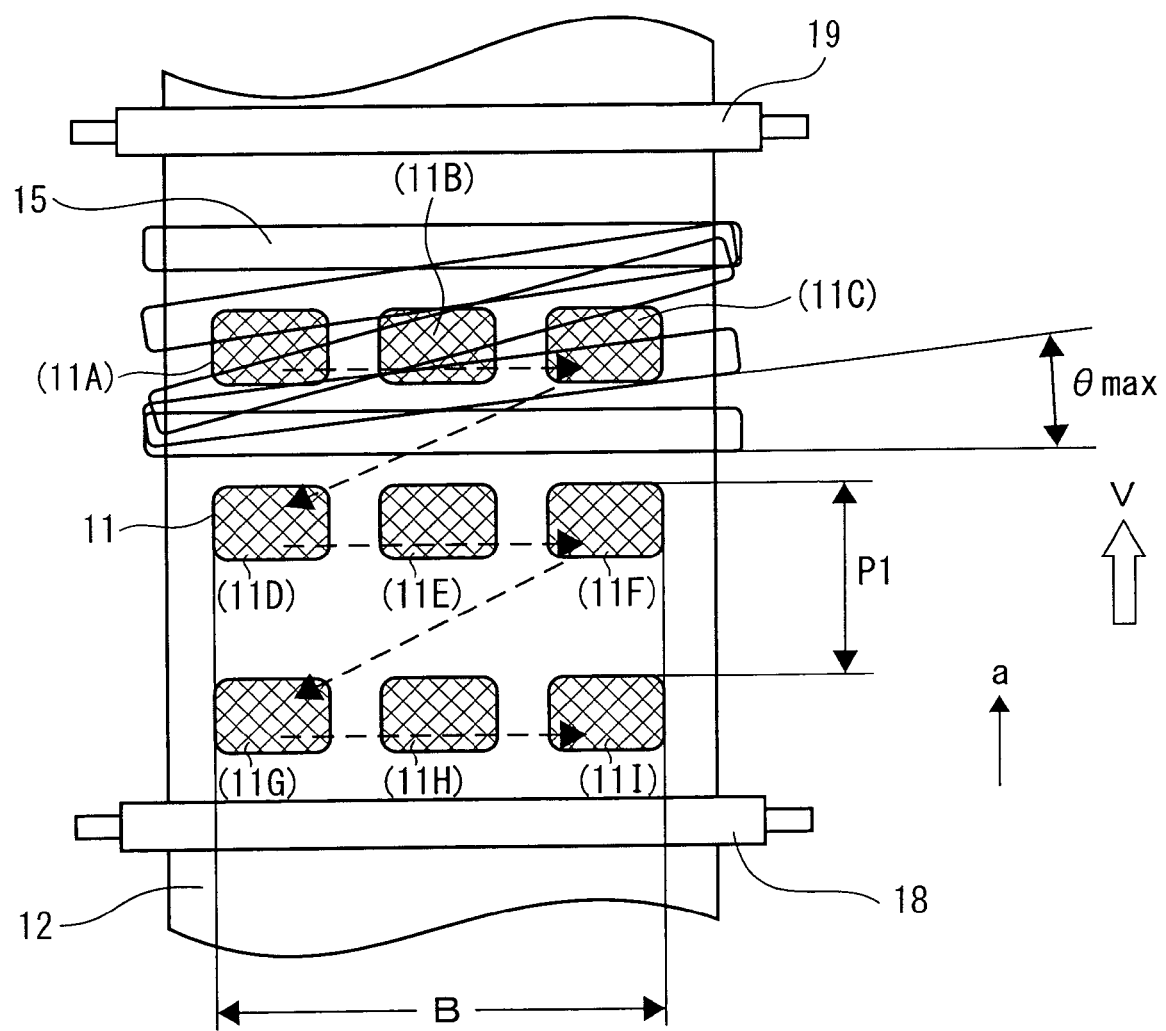
FIG. 10 is a diagram to explain identifying IC tags and sequence in which writing/reading of electronic information to/from the tags will be performed, according to a third embodiment of the invention.

FIG. 10 is a diagram to explain identifying IC tags and sequence in which reading/writing of electronic information from/to the tags will be performed, according to the third embodiment. Components corresponding to those described in the first embodiment are assigned the same reference numbers and their explanation is not repeated. The following description of the third embodiment focuses on difference from the first embodiment.

In the data processing apparatus 10 of the third embodiment, IC tags 11 are arranged at fixed pitch p1 in multiple rows (three rows in FIG. 10) along the direction of arrow a in which the conveying medium 12 and the IC tags 11 move and in multiple columns. The conveying medium 12 moves at a constant speed V in the direction of arrow a by the transport roller pairs 18, 19.

The antenna 15 is placed above and close to, being not in contact with, moving IC tags 11 on the conveying medium 12. To identify a plurality of IC tags 11 mounted on the conveying medium 12, the antenna is driven by the antenna adjuster 20 to turn back and forth horizontally around the center S of the length of the antenna 15 (see FIGS. 11 to 13) by a predetermined angle θ in the direction in which the conveying medium 12 (with the IC tags 11) moves and in the reverse direction. Although the antenna 15 appears to move downward, as depicted in FIG. 10, this depicts its relative position to the moving conveying medium 12 and it turns back and forth around the center S by predetermined angle θ horizontally, not downwardly. The pivot point of turning of the antenna 15 is not necessarily the center S; for example, the pivot point may be near to one end of the antenna 15.

The antenna adjuster 20 horizontally turns back and forth the resin board 15*b* with a high dielectric constant on which the wire 15*a* of the antenna 15 is laid out by predetermined angle θ by the pulse motor 23 and is configured by a known means.

The maximum angle θmax (degrees) of turning of the antenna is expressed by the following formula (3):

$$\tan \theta\max = P1/Q \quad (3)$$

where

P1: Pitch by which IC tags are separated, sequenced on the conveying medium in the conveyance direction (mm)

Q: Entire width of a sequence of IC tags (including intervals between IC tags) on the conveyance medium in the direction orthogonal to the conveyance direction (mm)

Speed α(degrees/sec) at which the antenna 15 turns is expressed by the following formula (4):

$$\alpha = \theta\max/(P1/V) \quad (4)$$

where

P1: Interval by which IC tags are separated, sequenced on the conveying medium in the conveyance direction (mm)

V: Speed at which the medium moves (mm/s)

In FIG. 10, if upper IC tags on the conveying medium are labeled 11A, 11B, 11C in order from the left, IC tags in one column below are labeled 11D, 11E, 11F, IC tags in one column below are labeled 11G, 11H, 11I, the IC tags will pass under the antenna 15 in sequence mentioned and, thus, each IC tag 11 can be identified.

Recoding electronic information that is executed under the control of the controller 30 will be outlined below. When an IC tag 11A first enters the coverage of the antenna 15, radio communication between the reader/writer 14 and the IC tag 11A takes place and the identifier ID of the IC tag 11A is input via the reader/writer 14 to the computer 28. The computer 28 identifies the particular IC tag 11A by its identifier ID and outputs electronic information associated with the recognized IC tag 11A to the reader/writer 14, and the reader/writer 14 writes the electronic information to the IC tag 11A. In the same procedure, writing electronic information to subsequent IC tags 11B to 11I is executed sequentially. Reading electronic information is also executed in the same way.

Figure 11A:
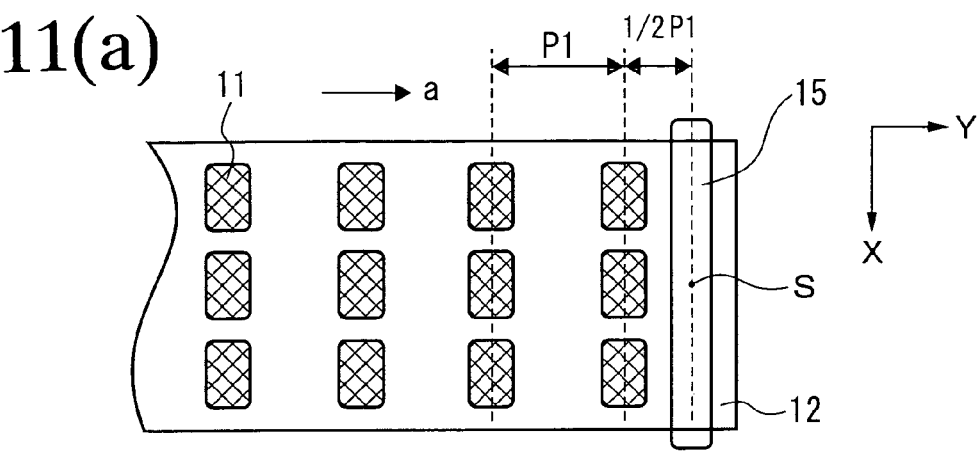
FIGS. 11(a) and 11(b) are diagrams to explain identifying IC tags and recording electronic information to the tags by horizontally turning back and forth of the antenna, according to the third embodiment.
Figure 11B:
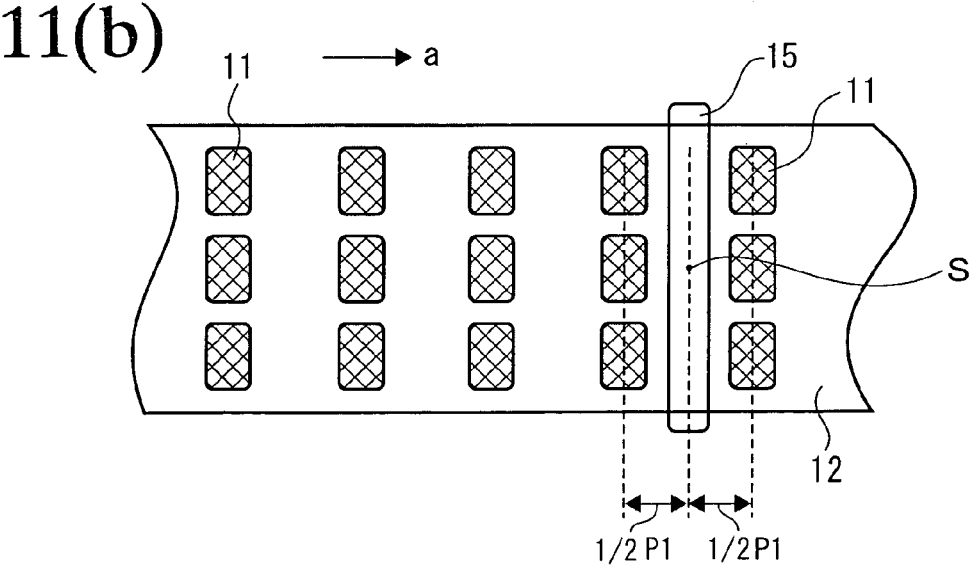
Figure 12A:
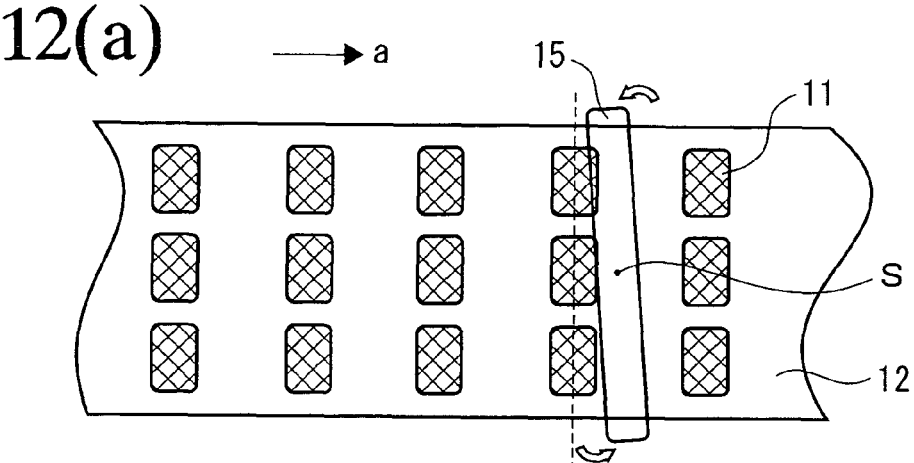
FIGS. 12(a), 12(b), and 12(c) are diagrams to explain identifying IC tags and recording electronic information to the tags by horizontally turning back and forth of the antenna, according to the third embodiment (continued).
Figure 12B:
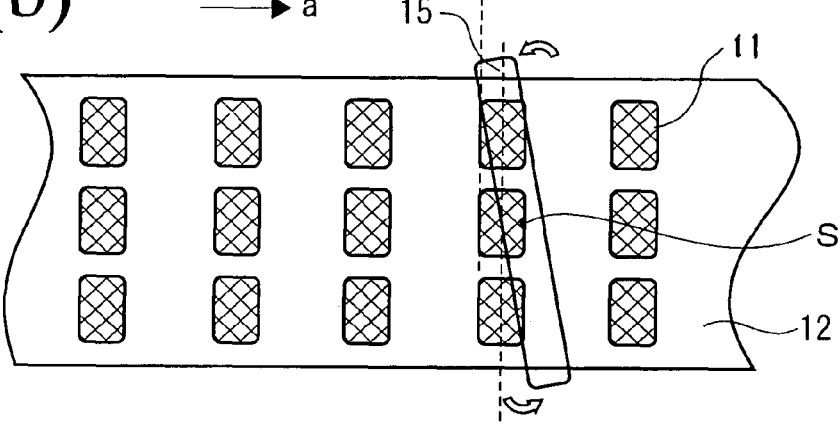
Figure 12C:
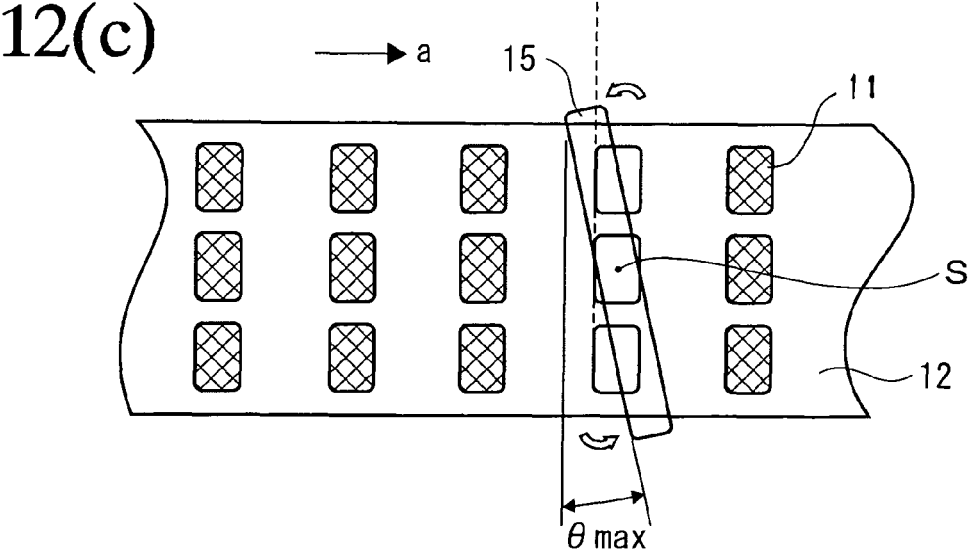
Figure 13A:
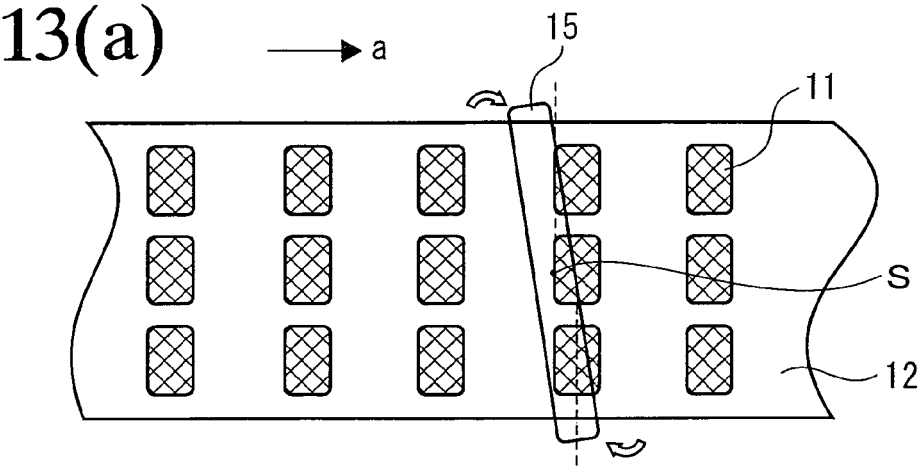
FIGS. 13(a), 13(b), and 13(c) are diagrams to explain identifying IC tags and recording electronic information to the tags by horizontally turning back and forth of the antenna, according to the third embodiment (continued).
Figure 13B:
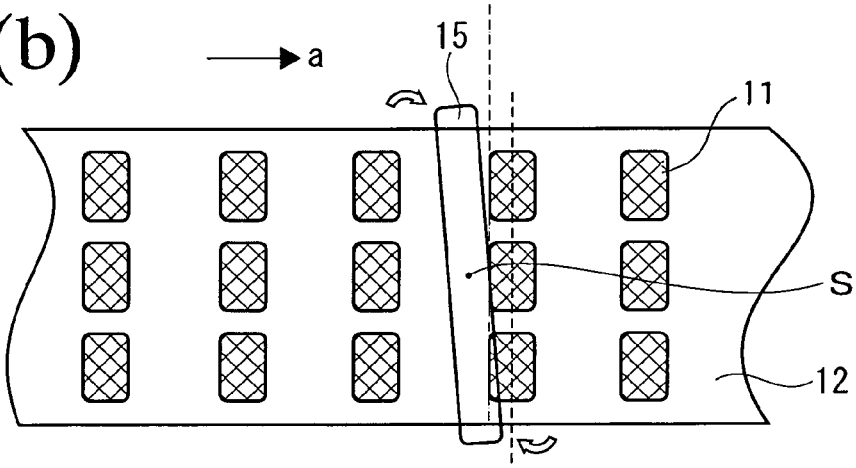
Figure 13C:
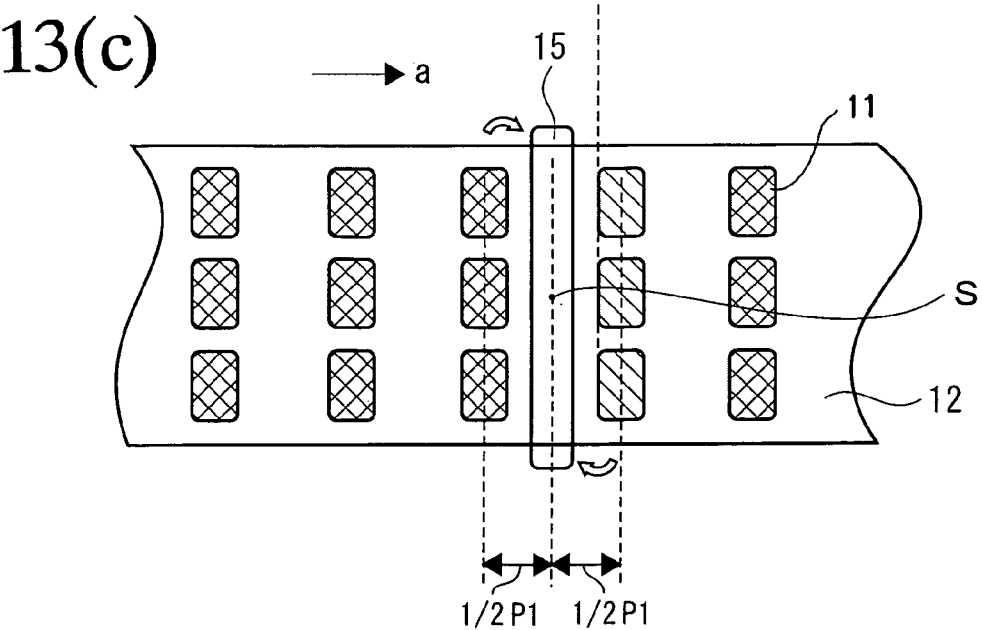

With reference to FIGS. 11(*a*) and 11(*b*), FIGS. 12(*a*) to 12(*c*), and FIGS. 13(*a*) to 13(*c*), the following will describe identifying IC tags and recording electronic information to the tags by horizontally turning back and forth of the antenna 15. In the following description, the direction of arrow a in which the conveying medium 12 moves is assumed to be Y-axis direction and the direction orthogonal to this is X-axis direction. When identifying IC tags 11 and recording electronic information to tags are performed by horizontally turning back and forth of the antenna 15, the conveying medium is assumed to continue to move at the predetermined speed V.

Based on the above calculation formulas (3) and (4) the maximum angle θmax by which the antenna 15 is skewed and the speed α at which the antenna 15 is turned is calculated and set on the controller 30. The conveying medium 12 is transported and the tag position sensor 24 detects the first IC tag.

Then, upon the elapse of a predetermined period of time, the antenna 15 that is at ½ P1 ahead of the forward edge of the IC tag, set parallel with the X axis, is assumed to be in its initial state and a motion of horizontally turning back and forth to skew the antenna 15 starts. FIGS. 11(*a*) and 11(*b*) show a positional relation between the antenna 15 in the initial state and IC tags 11.

When the antenna becomes the initial state, the antenna 15 motion of horizontally turning back and forth starts. For explanatory convenience, the following will describe an operation of recording electronic information to IC tags in the second column, which begins from the state that the antenna 15 has returned to its initial position, as shown in FIG. 11(*b*), after recording electronic information to IC tags 11 in the first column is finished.

After recording electronic information to the IC tags 11 in the first column is finished, when the antenna 15 returns to its initial position, the antenna 15 lies at intermediate position between the first column of IC tags 11 and the second column of IC tags 11, separated by ½ P1 from both the first and second columns of IC tags.

The antenna 15 begins to turn counterclockwise around the center S (see FIG. 12(*a*)). The antenna 15 continues to turn counterclockwise (see FIG. 12(*b*)) up to the maximum angle θmax (see FIG. 12(*c*)). At this time, the center line of the antenna 15 lies over the sequence of the IC tags.

Turned to the maximum angle θmax, the antenna 15 begins to turn clockwise, reversely, around the center S (see FIG. 13(*a*)). The antenna 15 continues to turn clockwise (see FIG. 13(*b*)) and returns to its initial position. The antenna 15 lies at intermediate position between the second column of IC tags and the third column of IC tags, separated by ½ P1 from both the second and third columns of IC tags (see FIG. 13(*c*)).

While the antenna turns counterclockwise from its initial position and turns clockwise back to the initial position as above, the reader/writer 14 writes electronic information by radio communication to the IC tags through the antenna 15.

By repeating the same motion of the antenna, the reader/writer writes electronic information to the IC tags on the medium sequentially. When writing electronic information to all the IC tags is finished, the write operation terminates.

As fully described above, according to one aspect of this invention, the data processing apparatus for IC tags which reads and/or writes electronic information from/to IC tags, each tag having a storage device and a wireless transceiver, sets its antenna skew at a predetermined angle to the direction in which the IC tags move and sequentially reads and/or writes electronic information to each IC tag.

This apparatus facilitates identifying each IC tag, even if a great number of IC tags are mounted on the conveying medium. This invention can provide a highly reliable data processing apparatus for IC tags capable of reading and/or writing of electronic information from/to a great number of IC tags.

According to another aspect of this invention, the data processing apparatus for IC tags which reads and/or writes electronic information from/to IC tags, each tag having a storage device and a wireless transceiver, reads and/or writes electronic information from/to each of a plurality of IC tags mounted on the conveying medium, while turning back and forth the antenna accordingly as the IC tags move.

This apparatus has a higher capability of identifying IC tags and facilitates identifying IC tags, even if the IC tags are arranged closely with each other. This invention can provide a highly reliable data processing apparatus for IC tags capable of reading and/or writing of electronic information from/to a great number of IC tags at high speed.

Moreover, the image forming device including the data processing apparatus for IC tags of this invention can perform recording visible information to conveying media and reading and/or writing electronic information from/to IC tags simultaneously and can produce media with IC tags at high speed and efficiency.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included herein.

What is claimed is:

1. A data processing apparatus for IC tags comprising:
   a reader/writer which reads and/or writes electronic information from/to IC tags which are mounted on a conveying medium and conveyed in a given direction, the IC tags each having a storage device and a wireless transceiver;
   an antenna of the reader/writer for radio communication between said reader/writer and an IC tag,
   wherein said antenna is set skew at a predetermined angle to the direction in which the IC tags move and said reader/writer reads and/or writes electronic information by radio communication from/to each of said IC tags mounted on the conveying medium sequentially;
   an antenna adjuster which adjusts the skew angle of said antenna; and
   a controller which determines the angle of the antenna to the direction in which the IC tags move, based on information about the arrangement of the IC tags mounted on said conveying medium, and works said antenna adjuster to set the antenna skew at said angle.

2. A data processing apparatus for IC tags, comprising:
   a reader/writer which reads and/or writes electronic information from/to IC tags which are mounted on a conveying medium and conveyed in a given direction, the IC tags being arranged in a plurality of rows along the given direction, each row containing a plurality of IC tags, and each IC tag having a storage device and a wireless transceiver; and
   an antenna of the reader/writer for radio communication between said reader/writer and an IC tag;
   wherein when said IC tags are mounted on said conveying medium, arranged in a plurality of rows along the given direction and in a plurality of columns across the given direction, and wherein in each column, second-row and subsequent-row IC tags are shifted back from one on a preceding row in the given direction by a fixed distance d from the tag in the preceding row, such that a line passing through the centers of the IC tags in each column is skewed at an angle β to the direction orthogonal to the given direction, such that said angle β is determined from the formula:

$$\tan \beta = \frac{G_t}{R_w * n + G_w * (n-1)}$$

wherein:
   $G_t$ is a distance of spacing between successive IC tags in the direction of travel, in mm;
   $G_W$ is a distance of spacing between successive IC tags in a direction orthogonal to the direction of travel of the IC tags, in mm;
   $R_W$ is a length of an IC tag in the direction orthogonal to the direction of travel of the IC tags, in mm; and
   n is the number of IC tags sequenced in the direction orthogonal to the direction of travel of the IC tags, in mm;
   and wherein said antenna is perpendicular to the given direction.

3. A data processing apparatus for IC tags, comprising:
   a reader/writer which reads and/or writes electronic information from/to IC tags which are mounted on a conveying medium and conveyed in a given direction, the IC tags each having a storage device and a wireless transceiver;
   an antenna of the reader/writer for radio communication between said reader/writer and an IC tag; and
   a controller which controls said reader/writer to read and/or write electronic information by radio communication from/to each of a plurality of IC tags mounted on said conveying medium sequentially, and an antenna adjuster that turns back and forth the position of said antenna around a center point by an angle θ accordingly as said IC tags are being conveyed.

4. An image forming device, comprising:

a reader/writer which reads and/or writes electronic information from/to IC tags which are mounted on a conveying medium and conveyed in a given direction, the IC tags each having a storage device and a wireless transceiver;

an antenna of the reader/writer for radio communication between said reader/writer and an IC tag;

a controller which controls said reader/writer to read and/or write electronic information by radio communication from/to each of a plurality of IC tags mounted on said conveying medium sequentially, an antenna adjuster that turns back and forth the position of said antenna around a center point by an angle A accordingly as said IC tags being conveyed; and a printer which forms an image on the conveying medium on which said IC tags are mounted.

5. A method for reading and/or writing electronic information from/to IC tags which are mounted on a conveying medium and conveyed in a given direction, the IC tags each having a storage device and a wireless transceiver, said method comprising:

determining a skew angle θ from the formula:

$$\tan\theta = \frac{G_t}{R_w * n + G_w * (n-1)}$$

wherein:

$G_t$ is a distance of spacing between successive IC tags in the direction of travel, in mm;

$G_W$ is a distance of spacing between successive IC tags in a direction orthogonal to the direction of travel of the IC tags, in mm;

$R_W$ is a length of an IC tag in the direction orthogonal to the direction of travel of the IC tags in mm; and n is the number of IC tags sequenced in the direction orthogonal to the direction of travel of the IC tags, in mm;

conveying in a given direction a plurality of IC tags mounted on the conveying medium, arranged in a plurality of rows along the direction in which the conveying medium moves each row containing a plurality of IC tags; and reading and/or writing electronic information from/to each of said plurality of IC tags sequentially in a state that an antenna of a reader/writer for radio communication between said reader/writer and an IC tag is set skew at said determined skew angle θ such that if the IC tags are arranged in even alignment with each other in a column that extends perpendicular to the given direction, each of said plurality of IC tags will sequentially fall within the antenna coverage at different times.

6. A data processing apparatus for IC tags comprising:

a reader/writer which reads and/or writes electronic information from/to IC tags which are mounted on a conveying medium and conveyed in a given direction, the IC tags being arranged in a plurality of rows along the given direction, each row containing a plurality of IC tags, and each IC tag having a device and a wireless transceiver; and an antenna of the reader/writer for radio communication between said reader/writer and an IC tag, wherein said antenna is set skew at an angle such that, if a plurality of IC tags is arranged in an even alignment with each other in a column that extends perpendicular to the given direction, each IC tag will reach the antenna sequentially at different times, and said reader/writer reads and/or writes electronic information by radio communication from/to each of said IC tags mounted on the conveying medium sequentially wherein the skew angle is determined from the formula $$\tan\theta = \frac{G_t}{R_w * n + G_w * (n-1)}$$

wherein:

$G_t$ is a distance of spacing between successive IC tags in the direction of travel, in mm;

$G_W$ is a distance of spacing between successive IC tags in a direction orthogonal to the direction of travel of the IC tags, in mm;

$R_W$ is a length of an IC tag in the direction orthogonal to the direction of travel of the IC tags in mm; and n is the number of IC tags sequenced in the direction orthogonal to the direction of travel of the IC tags, in mm.

7. A data processing apparatus for IC tags comprising:

a reader/writer which reads and/or writes electronic information from/to IC tags which are mounted on a conveying medium and conveyed in a given direction, the IC tags each having a storage device and a wireless transceiver;

an antenna of the reader/writer for radio communication between said reader/writer and an IC tag, an antenna adjuster which adjusts a skew angle of said antenna; and a controller which determines the angle of the antenna to the direction in which the IC tags move, based on information about the arrangement of the IC tags mounted on said conveying medium, and works said antenna adjuster to set the antenna skew at said angle.

8. An image forming device comprising:

the data processing apparatus for IC tags of claim 1; and a printer which forms an image on the conveying medium on which said IC tags are mounted.

* * * * *